(12) United States Patent
Duchemin et al.

(10) Patent No.: US 8,695,668 B2
(45) Date of Patent: Apr. 15, 2014

(54) TIRE COMPRISING A BIELASTIC REINFORCING ELEMENT

(75) Inventors: Sylvie Duchemin, Riom (FR); Emmanuel Lacour, Royat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1302 days.

(21) Appl. No.: 12/084,153

(22) PCT Filed: Oct. 3, 2006

(86) PCT No.: PCT/EP2006/067003
§ 371 (c)(1),
(2), (4) Date: Apr. 25, 2008

(87) PCT Pub. No.: WO2007/048683
PCT Pub. Date: May 3, 2007

(65) Prior Publication Data
US 2009/0139631 A1    Jun. 4, 2009

(30) Foreign Application Priority Data
Oct. 27, 2005   (FR) .................................... 05 11122

(51) Int. Cl.
*B60C 9/00*      (2006.01)
*B60C 9/02*      (2006.01)
(52) U.S. Cl.
USPC ......................................... 152/548; 152/555
(58) Field of Classification Search
USPC ................................................ 152/555, 548
See application file for complete search history.

(56) References Cited

U.S. PATENT DOCUMENTS

| 3,667,142 | A | * | 6/1972 | Goodloe et al. | .................. 38/66 |
| 3,699,768 | A | * | 10/1972 | Roberts et al. | .................. 57/213 |
| 3,763,913 | A | * | 10/1973 | French et al. | .................. 152/526 |
| 3,789,900 | A | | 2/1974 | Verdier | |
| 4,731,137 | A | * | 3/1988 | Schmidt et al. | ................ 156/125 |
| 5,309,971 | A | * | 5/1994 | Baker et al. | .................... 152/541 |
| 6,634,397 | B1 | | 10/2003 | Oare et al. | |

FOREIGN PATENT DOCUMENTS

| FR | 2864470 | * | 7/2005 |
| JP | 06-199114 | * | 7/1994 |
| JP | 2001/198316 | | 7/2000 |
| JP | 2002-331808 | * | 11/2002 |
| KR | 2001002256 | * | 1/2001 |

OTHER PUBLICATIONS

Machine translation of JP 06-199114, 1994.*
Machine translation of FR 2864470, 2005.*

* cited by examiner

*Primary Examiner* — Justin Fischer
(74) *Attorney, Agent, or Firm* — Dickinson Wright PLLC

(57) ABSTRACT

The invention relates to a tire comprising at least one, and preferably at least two, reinforcing structures of the carcass type, one inner one and one outer one, possibly one or more crown reinforcing structures, at least one circumferential bielastic reinforcing element consisting of a bielastic fabric in which the said fabric used is a bielastic knit, namely a loop mesh fabric the mesh-forming loops of which are able to move relative to one another in the direction of knitting and in the direction perpendicular to the direction of knitting, the said bielastic reinforcement being positioned in such a way as to run substantially parallel along a portion of a reinforcing structure.

15 Claims, 14 Drawing Sheets

TIRE COMPRISING A BIELASTIC REINFORCING ELEMENT

The invention relates to a tire comprising at least one circumferential bielastic reinforcing element which is made of a bielastic fabric.

In the conventional way, tires are incessantly being subjected to numerous mechanical stresses the direct result of which is that certain not so well designed products have lives which are far shorter than those which take the more exacting demands into consideration. This is particularly true of tires of the agricultural type which are constantly subjected to the hostile environment and multiple unforeseeable conditions of agricultural soil, often under heavy load, combined with low pressures both to limit the effects of compaction and to improve efficiency.

A first subject of the invention is therefore a tire comprising at least one, and preferably at least two, reinforcing structures of the carcass (bias-belted or radial) type, one inner and the other outer, each of the said carcass-type reinforcing structures running circumferentially from the bead towards the said sidewall, and is anchored on each side of the tire in a bead the base of which is configured to be mounted on a rim seat, each bead being extended radially outwards by a sidewall, the sidewalls radially outwards meeting a tread, the said tire further comprising at least one circumferential bielastic reinforcing element which is made of a bielastic fabric in which the said fabric used is a bielastic knit, namely a loop mesh fabric the mesh-forming loops of which are able to move relative to one another in the direction of knitting and in the direction perpendicular to the direction of knitting, the said bielastic reinforcement being positioned in such a way as to extend substantially parallel along a portion of a reinforcing structure (of the carcass or crown reinforcement type).

The use of a bielastic reinforcing element improves the resistance to the propagation of cracks. The endurance and durability of the products can thus be improved. Advantageously, depending on the precise properties being sought, the position of the reinforcing element will be selected from a number of potential positions with respect to the carcass and/or crown type reinforcing structures (if there are any crown reinforcements): for example, on the inside or on the outside or between two structures. Several bielastic reinforcements can also occupy various combinations of these positions. An architecture such as this is particularly advantageous in tires of the agricultural type. In use, most agricultural-type tires need to adapt their inflation pressure to suit the type of ground: road or agricultural soil, the pressure being appreciably lower in the latter instance in order to limit the compaction of the ground and reduce the risk of crop damage. For example, some tires have a nominal pressure of 3.2 bar for driving along the road, this pressure having to be reduced to one bar for driving over agricultural ground. The pressures to be used are often determined as a function of the speeds (usually ranging between 10 and 90 km/h) and the loads (which may be as much as almost 15 tons per tire). To make these changes easier, certain agricultural vehicles are equipped with devices that make it possible easily to control or to alter the tire pressures. More recently, low-pressure agricultural tires designed for road running and/or for driving on agricultural soil always at the same pressure have appeared on the market. Agricultural tires are also often provided with lugs that help with traction when used on loose ground.

Advantageously, the said bielastic reinforcing element is, for the most part, positioned in that portion of the sidewall that lies radially outside of a position corresponding to H/2.

According to one advantageous embodiment, the tire comprises at least one crown reinforcing structure, each comprising a series of crown reinforcing threads each of which is positioned in such a way as to run transversely.

According to another exemplary embodiment, the said bielastic reinforcing element is, for the most part, positioned in the crown region of the tire.

According to one advantageous embodiment, the said bielastic reinforcing element has a minimum length corresponding to 1/10 of the arc L, the arc L substantially corresponding to the path of the carcass-type reinforcing structures between the position corresponding to H/2 and a straight line passing through the point N and perpendicular to the point of intersection with the outer portion of the shoulder, the end point N of the shoulder being defined, in the shoulder region of the tire, by the orthogonal projection onto the exterior surface of the tire of the intersection between, on the one hand, the tangents to the surfaces of an axially outside end of the tread (tops of the lugs) and, on the other hand, the radially outside end of a sidewall.

Advantageously, the length of the reinforcing element is greater than 70% of the length of the arc L, and more preferably still is greater than 80% of the length of the arc L.

According to another advantageous embodiment, the bielastic fabric has at least one and preferably all of the following properties:
 an elastic elongation of at least 8%,
 a mesh size smaller than or equal to 150 meshes per decimeter and preferably 200 meshes per decimeter.

The said fabric preferably comprises at least one material chosen from polyamides, polyesters, rayon, cotton, wool, aramide, silk and linen.

According to another advantageous embodiment, the fabric contains a certain proportion of elastic threads.

According to another advantageous embodiment, the fabric or knit has a thickness ranging between 0.2 mm and 2 mm and preferably between 0.4 and 1.2 mm.

According to another advantageous embodiment, the fabric or knit has a basis weight generally of between 70 and 700 $g/m^2$ and preferably between 140 and 410 $g/m^2$.

According to another advantageous embodiment, the bielastic knit is made of at least one polymer chosen from thermosetting polymers and thermoplastic polymers.

According to yet another advantageous embodiment, the crown reinforcing structure comprises two or more arrangements of threads configured with opposed and substantially symmetric angles. The said angles of the threads preferably range between 5 and 70°.

The threads of the carcass-type reinforcing structure and the crown reinforcing threads may be either of similar natures (for example all textile) or alternatively may be of different natures: for example, the threads of the carcass-type reinforcing structure are of a textile type and the crown reinforcing threads are of a metallic type.

Advantageously, the fabric used is a bielastic knit, that is to say a loop mesh fabric the mesh-forming loops of which are able to move relative to one another in the direction of knitting and in the direction perpendicular to the direction of knitting. What bielastic means is that the material in question has properties that make it elastic in at least two substantially perpendicular directions and preferably in all directions.

The use of elastomeric fibers to produce these fabrics or knits is not therefore absolutely essential. It is possible to provide these in small proportions in order to make the material easier to use and to facilitate elastic return.

If, however, mere mechanical decoupling is desired, the use of an elastomeric matrix may provide an improvement in the decoupling capability.

The term bielastic fabric also covers structures which have the ability to undergo reversible elastic deformation but which are not necessarily obtained by knitting. These may, in particular, be structures obtained by crocheting, or looped or needle-punched assemblies.

The interlacing of the loops forms a network that can be deformed elastically in two substantially perpendicular directions. In the advantageous instance where use is made of a bielastic knit, the deformability of this bielastic knit according to the invention stems especially from the knitted structure, the fibers of which the knit is formed sliding relative to one another within the mesh net. In general, the elastic elongation of the bielastic knit according to the invention is at least 10% in at least one of the two directions of elongation. It is advantageously 50% or more, or more especially still, 100% or more. These properties of course refer to the knit before it is incorporated into the tire according to the invention.

The direction in which the bielastic knit is laid over the regions that are to be protected is advantageously such that the direction of the knit that has the greatest capacity for elongation runs parallel to the direction of the highest stress acting in the said region.

Other features and advantages of the invention will become apparent from reading one exemplary embodiment of a tire according to the invention, with reference to the attached figures in which.

In the text, the terminology "lower" will be used to denote any layer or surface radially oriented towards the tire and "upper" will be used to denote any layer or surface radially oriented away from the tire, particularly a layer or surface in contact with the air.

The term "axial" means a direction parallel to the axis of rotation of the tire; this direction may be "axially inside" when it is directed towards the inside of the tire and "axially outside" when directed towards the outside of the tire.

The term "crown reinforcing structure" is used in this text. Usually, this element is often known by the term "crown reinforcement".

Figure 1A:
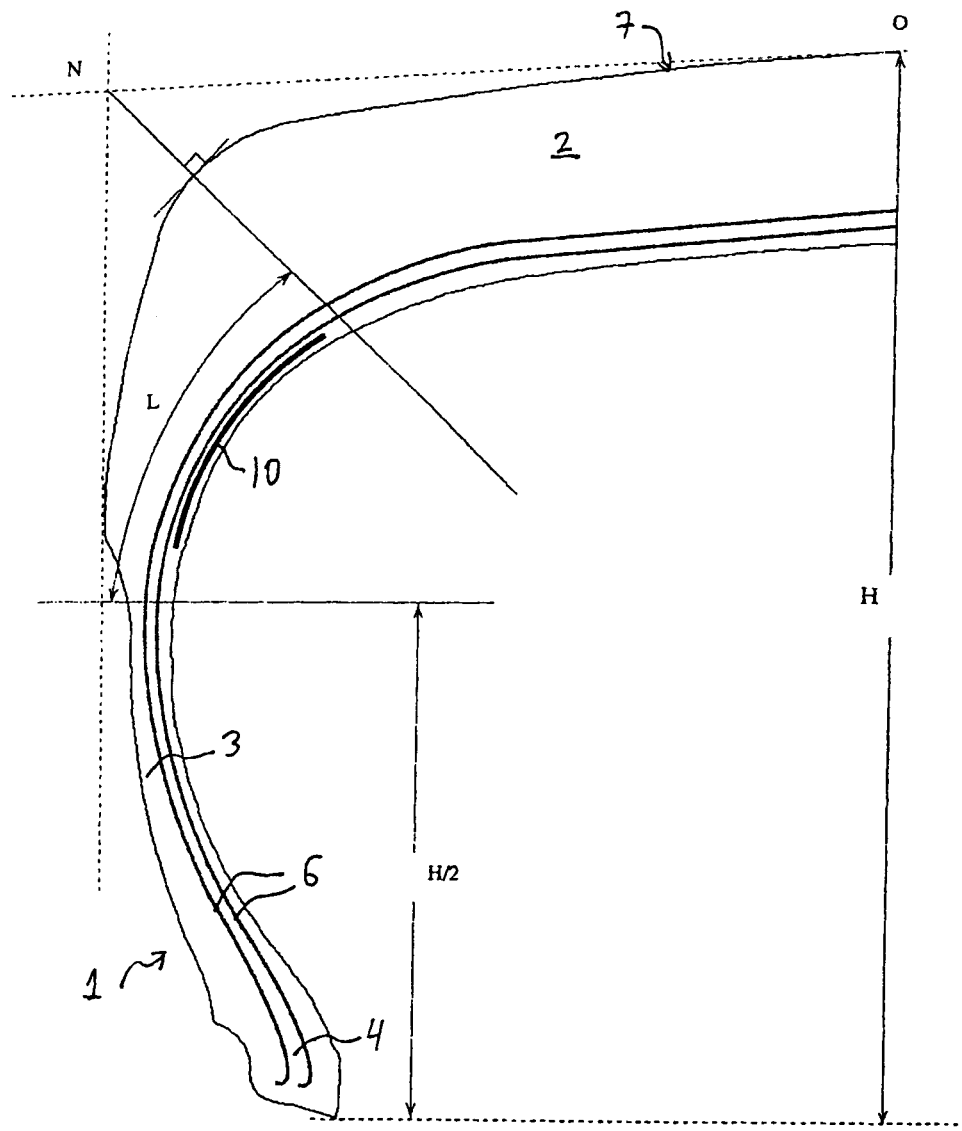
FIG. 1a depicts a cross section through half a tire, with one side wall and a portion of the crown, with a first example of a positioning of a bielastic reinforcing element.

FIG. 1a schematically depicts a radial half section of a tire 1 with a carcass reinforcement. This tire 1 has a crown 2, sidewalls 3, beads 4, two carcass-type reinforcing structures 6 extending from one bead to the other. The crown 2 is surmounted by a tread 7. The reinforcing structures 6 are anchored in the bead in a conventional way, for example by wrapping them around a bead wire or by interposing them between windings of circumferential threads, in collaboration with a anchoring rubber compound, preferably a high modulus compound.

In the various examples illustrated, two carcass-type reinforcing structures are shown. Some tires according to the invention, particularly those of an agricultural type, may have a different number of structures, for example may have three or even more or, in some instances, may have just one. In the case of bias belted tires, there may be as many as eight carcass-type reinforcing structures.

At least one reinforcing element 10 is positioned near at least one of the said reinforcing structures. In FIG. 1a, the element 10 is positioned, on the one hand, on the inside of all the reinforcing structures 6 and, on the other hand, in the radially outside portion of the sidewall, between H/2 and a straight line passing through the point N and perpendicular to the surface of the tire. The shoulder end point N is defined, in the shoulder region of the tire, by the orthogonal projection onto the exterior surface of the tire of the intersection between, on the one hand, the tangents to the surfaces of an axially outside end of the tread (the tops of the lugs) and, on the other hand, the radially outside end of a sidewall.

The reinforcing element 10 advantageously is made of an elastic knit of low apparent density and which is highly deformable. This provides elasticity through the sliding of the threads and the deformation of the meshes. It to a certain extent provides mechanical decoupling between the architectural components between which it is inserted. Furthermore, the advantage of an elastic knit is obviously that it has enough structural flexibility to accompany the deformations of the tire. Thus it will be possible to choose various kinds of material of which to form this elastic knit: its thickness, its void fraction and its density are directly linked to this choice and to the structure of the knit (diameter of the thread, number of meshes per dm and tightness).

The bielastic fabric has at least one and preferably all of the following properties:
- an elastic elongation of at least 8%,
- a mesh size smaller than or equal to 150 meshes per decimeter and preferably 200 meshes per decimeter.

For example, tests conducted with a knit having 240 meshes per decimeter along one side and 235 meshes per decimeter along the other side yielded highly advantageous results particularly in terms of resistance to cracking.

In general, the bielastic knit according to the invention is made of synthetic fibers, natural fibers or a mixture of these fibers. By way of synthetic fibers, the bielastic knit according to the invention may contain at least one type of fibers chosen from polyamide-6, polyamide-6,6 (nylon), polyesters, etc.

Thus, advantageously, the said fabric comprises at least one material chosen from polyamides, polyesters, rayon, cotton, wool, aramid, silk, linen.

According to an advantageous alternative form, a certain proportion of elastic threads such as threads made of polyurethane, latex, natural or synthetic rubber may prove beneficial in order to provide for elastic return, making the fabric easier to work with. Thus, by way of example of a bielastic knit according to the invention, mention may be made of the knit marketed by Milliken under the reference 2700 made up of 82% polyamide-6 fibers and 18% 44 dTex polyurethane fibers.

The bielastic knit or fabric according to the invention has a thickness ranging between 0.2 mm and 2 mm and preferably between 0.4 and 1.2 mm.

Its basis weight generally ranges between 70 and 700 g/m$^2$ and preferably between 140 and 410 g/m$^2$.

According to an alternative form of embodiment, the bielastic knit is made up of at least one polymer chosen form thermosetting polymers and thermoplastic polymers.

As a preference, the elastic knit may have a density of at least 0.02 g/cm$^3$, measured in the conventional way, it being possible for this density to be as high as 0.50 g/cm$^3$.

Another feature of the elastic knit that can be used in the context of the invention is its void fraction. In general, according to the invention, the void fraction will advantageously be at least 40% so that the knit is compressible enough. This void fraction can be calculated by comparing the density of the knit with that of the compact material that makes up its matrix, measured by any conventional means.

Examples of nonelastomeric materials of which the matrix of these knits could be formed include:
  natural textile fibers such as cotton, wool, linen, hemp, silk, etc.,
  artificial textile fibers such as rayon;
  synthetic textile fibers for example made of polyester, polyamide, aramid, polyvinylchloride, polyolefins, etc.,
  inorganic fibers for example made of glass, silica or Rockwool.

Examples of elastomeric materials may include natural rubber, polybutadiene, SBR, polyurethane, etc.

FIGS. 2 to 11 illustrate various alternative forms of embodiment in which the position and/or the number of reinforcing elements varies. Other parameters may also vary, such as the length, the distance with respect to the reinforcing structures, etc.

Figure 1B:
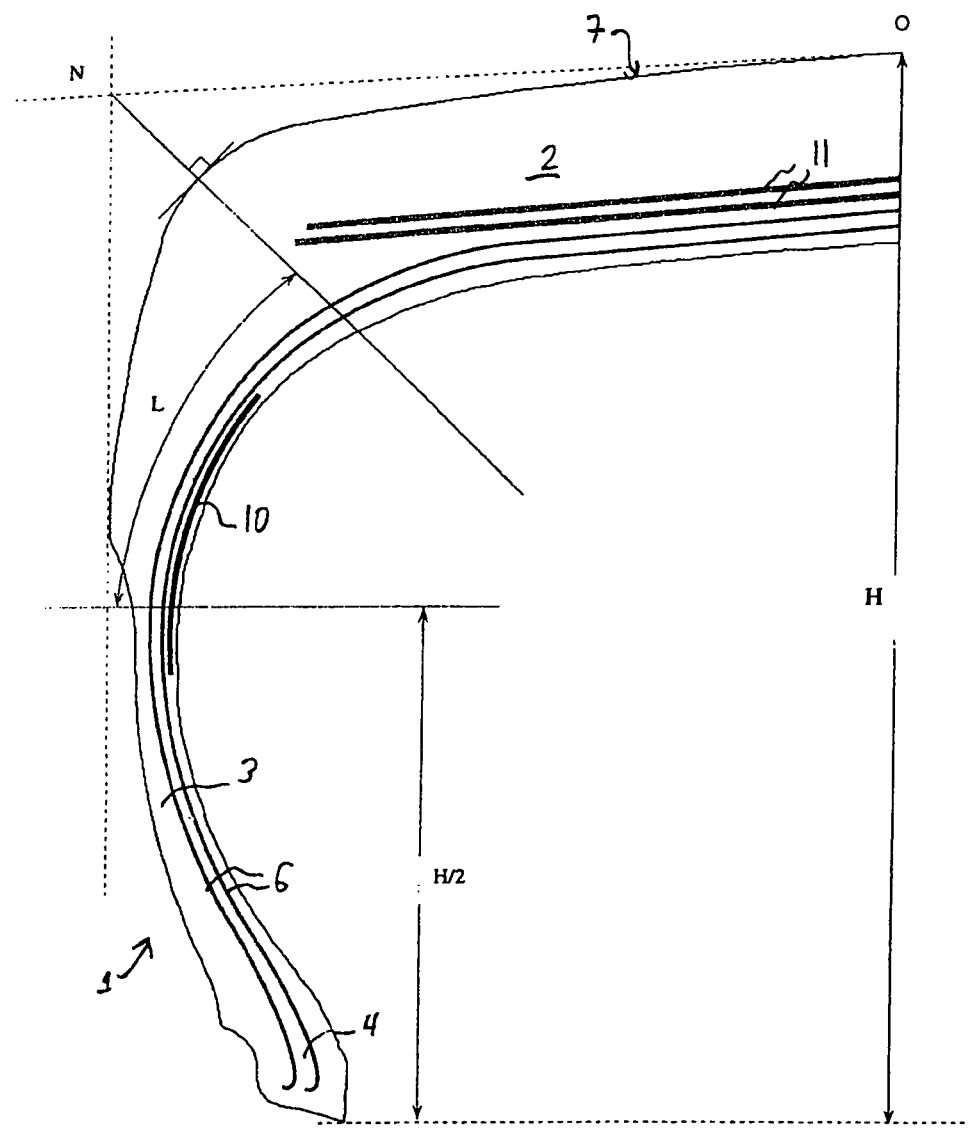
FIG. 1b depicts a section similar to that of FIG. 1a, with a second example of the positioning of a bielastic reinforcing element.
Figure 1C:
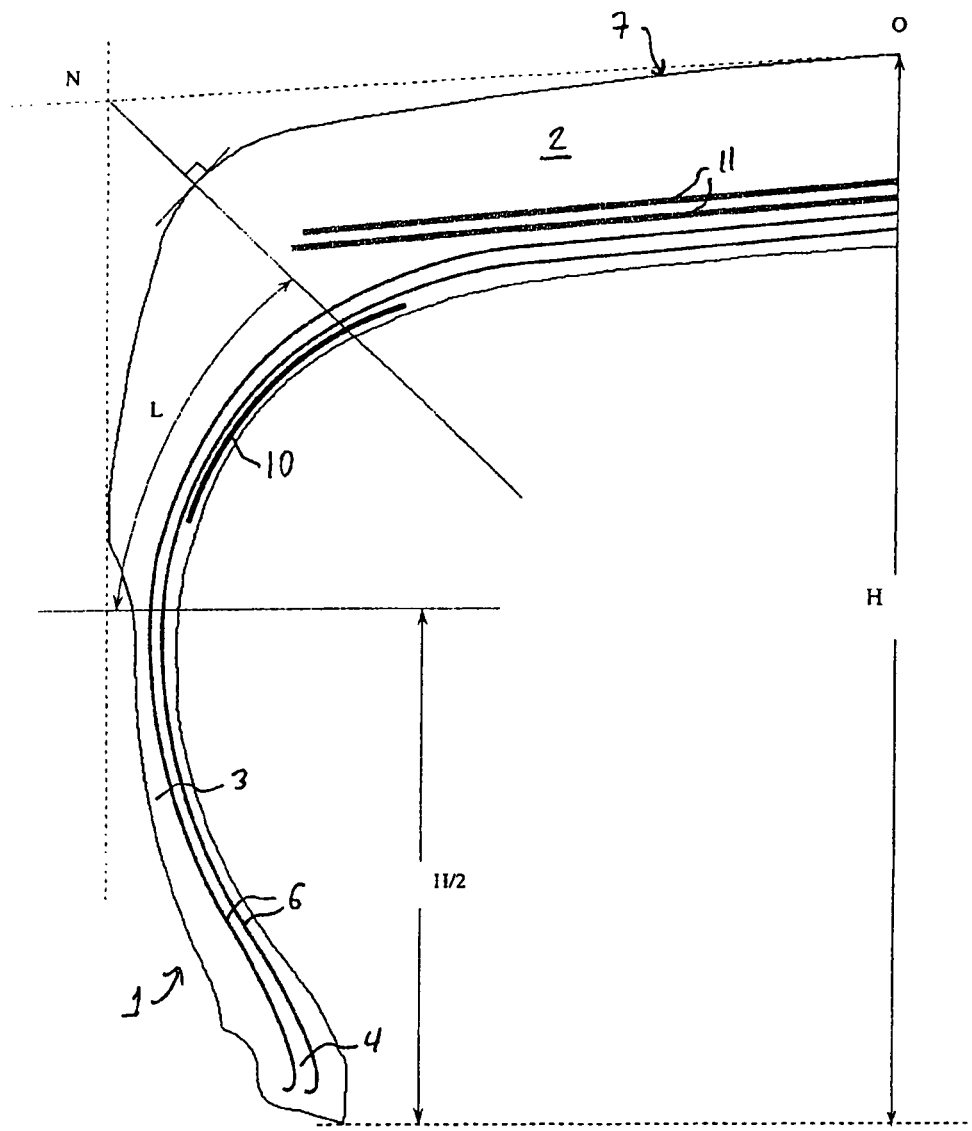
FIG. 1c depicts a section similar to that of FIG. 1a with a third example of the positioning of a bielastic reinforcing element.

In FIG. 1b, the said element 10 is positioned a little further in radially and thus extends radially inward beyond the position H/2. In FIG. 1c, the said element 10 is positioned a little further out radially and thus extends radially out beyond the line that passes through the point N.

Figure 2:
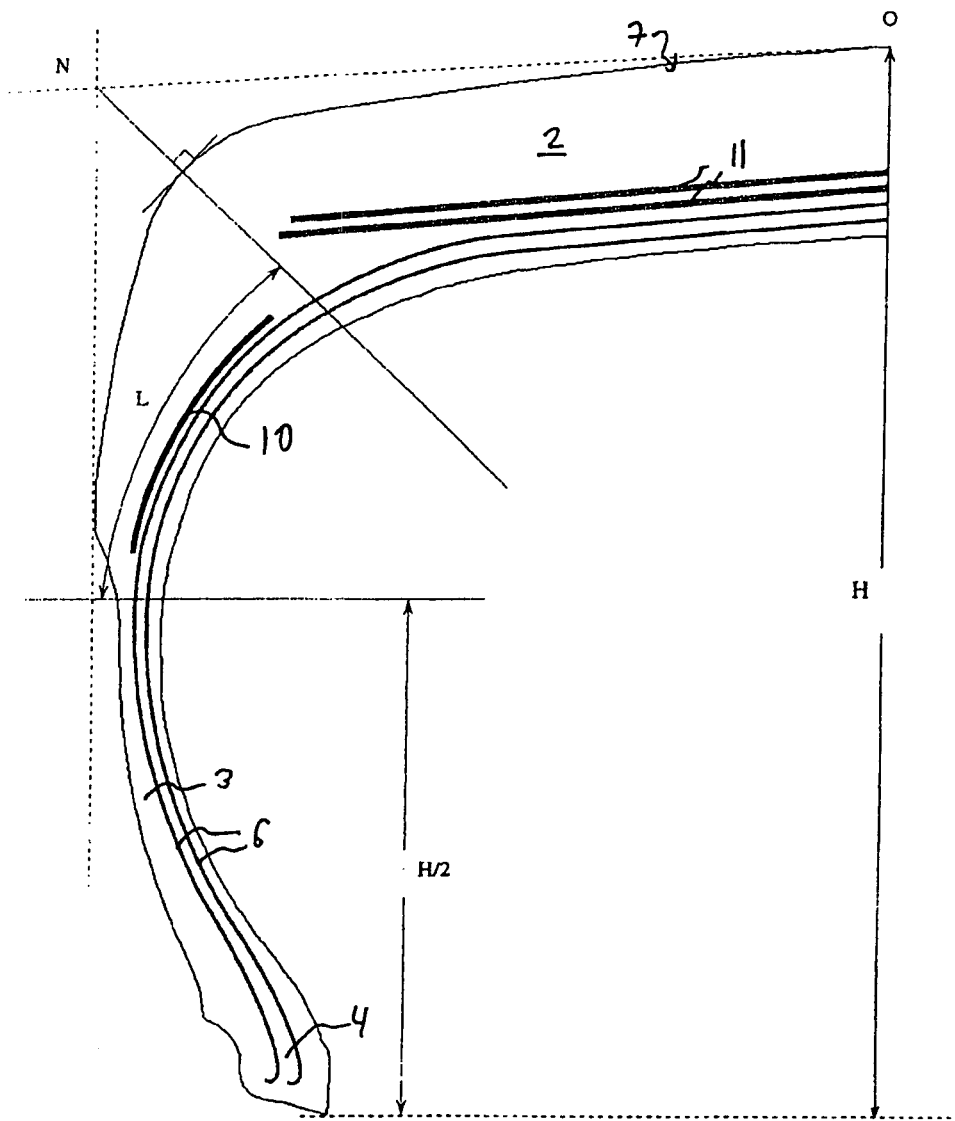
FIG. 2 depicts a section similar to that of FIG. 1a with a fourth example of the positioning of a bielastic reinforcing element.
Figure 3:
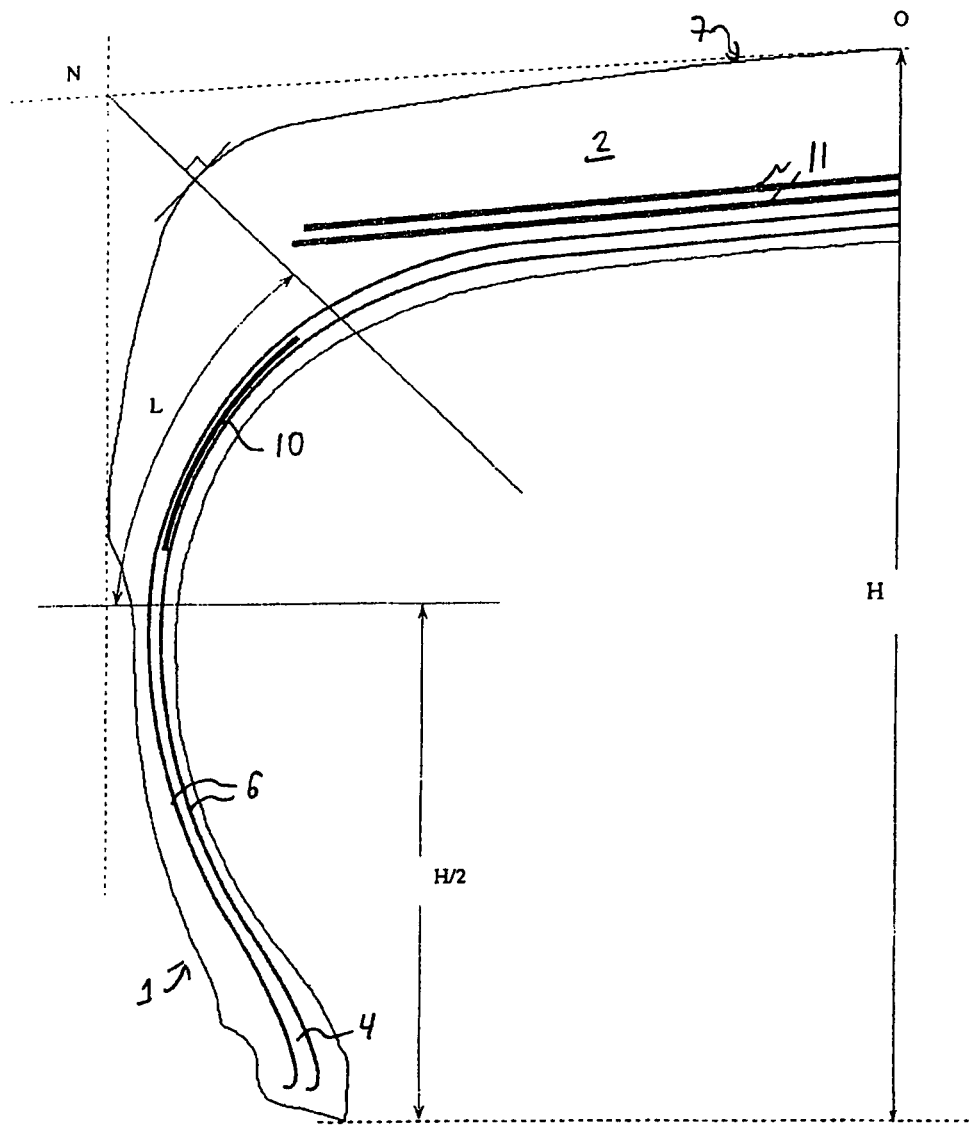
FIG. 3 depicts a section similar to that of FIG. 1a with a fifth example of the positioning of a bielastic reinforcing element.

In FIG. 2, the said element 10 is positioned on the outside of the reinforcing structures 6 in the radially outside portion of the sidewall, just as in the example of FIG. 1a. In FIG. 3, the element 10 is positioned between two reinforcing structures 6.

Figure 4:
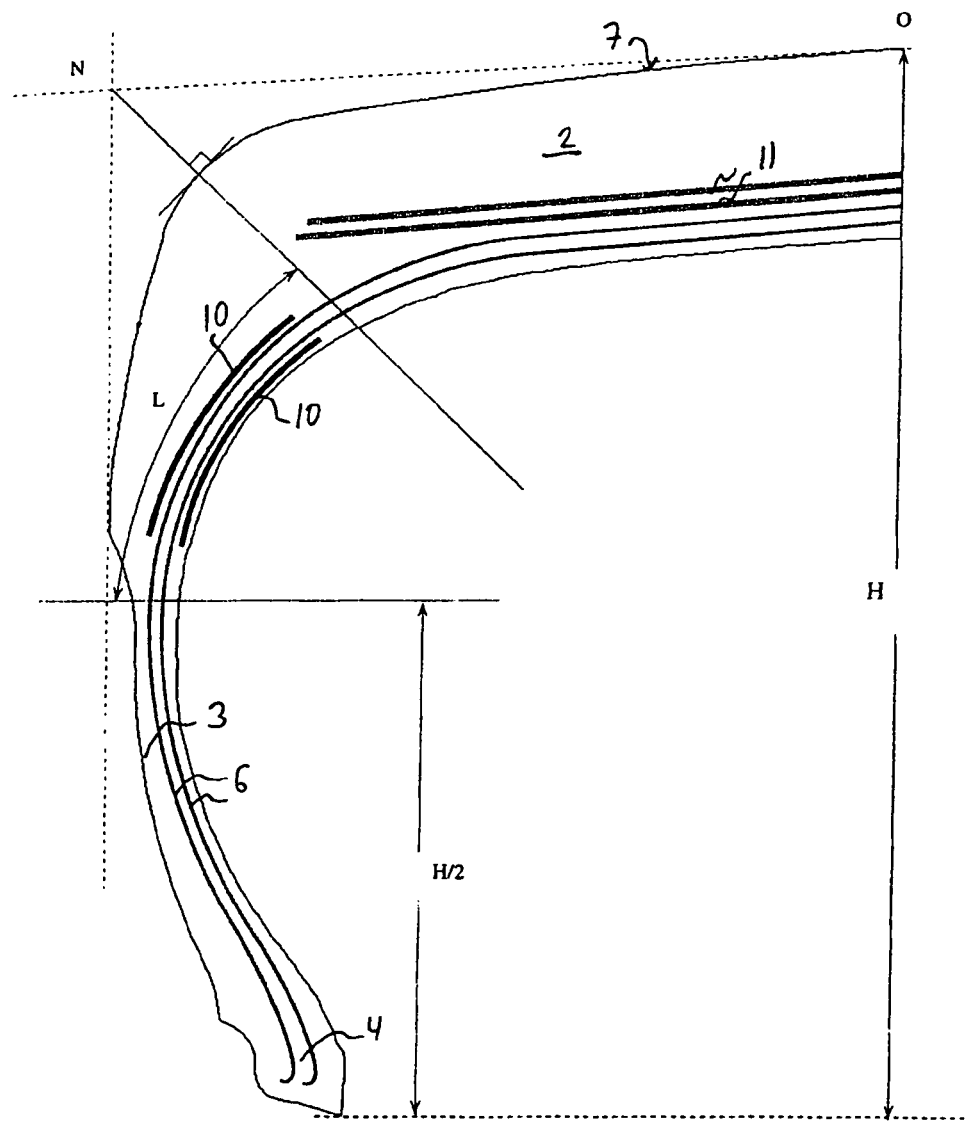
FIG. 4 depicts a section similar to that of FIG. 1a with an example of the positioning of several bielastic reinforcing elements.
Figure 5:
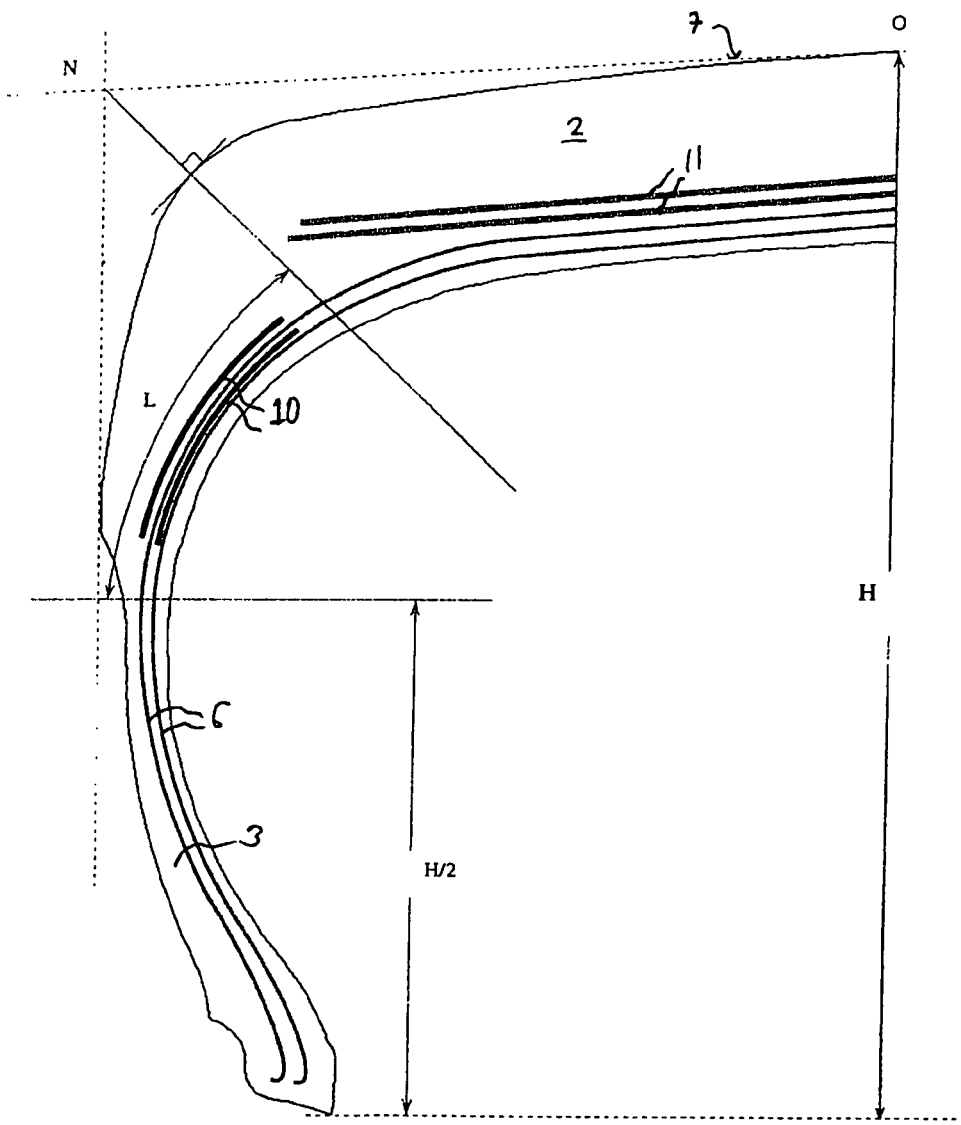
FIG. 5 depicts a section similar to that of FIG. 1a with another example of the positioning of several bielastic reinforcing elements.
Figure 6:
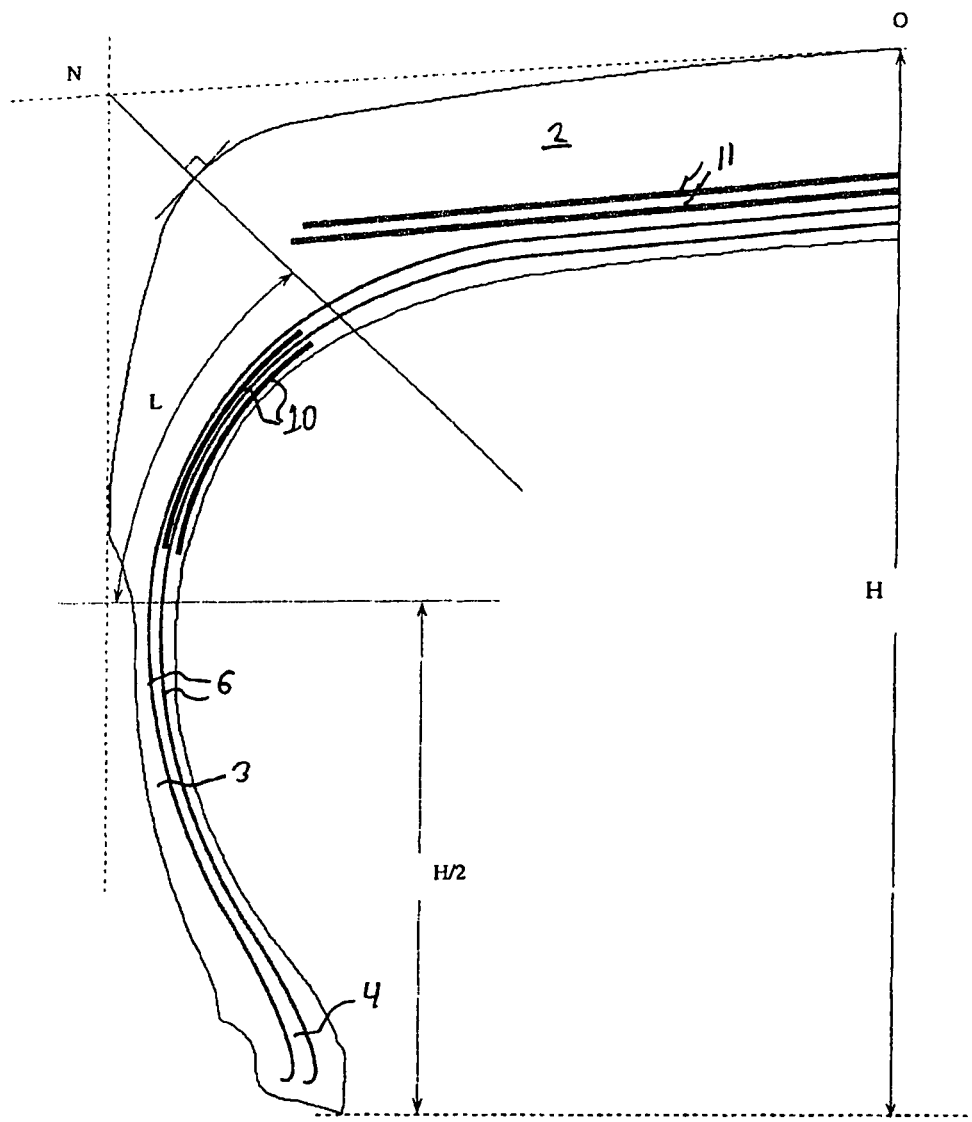
FIG. 6 depicts a section similar to that of FIG. 1a, with yet another example of the positioning of several bielastic reinforcing elements.
Figure 7:
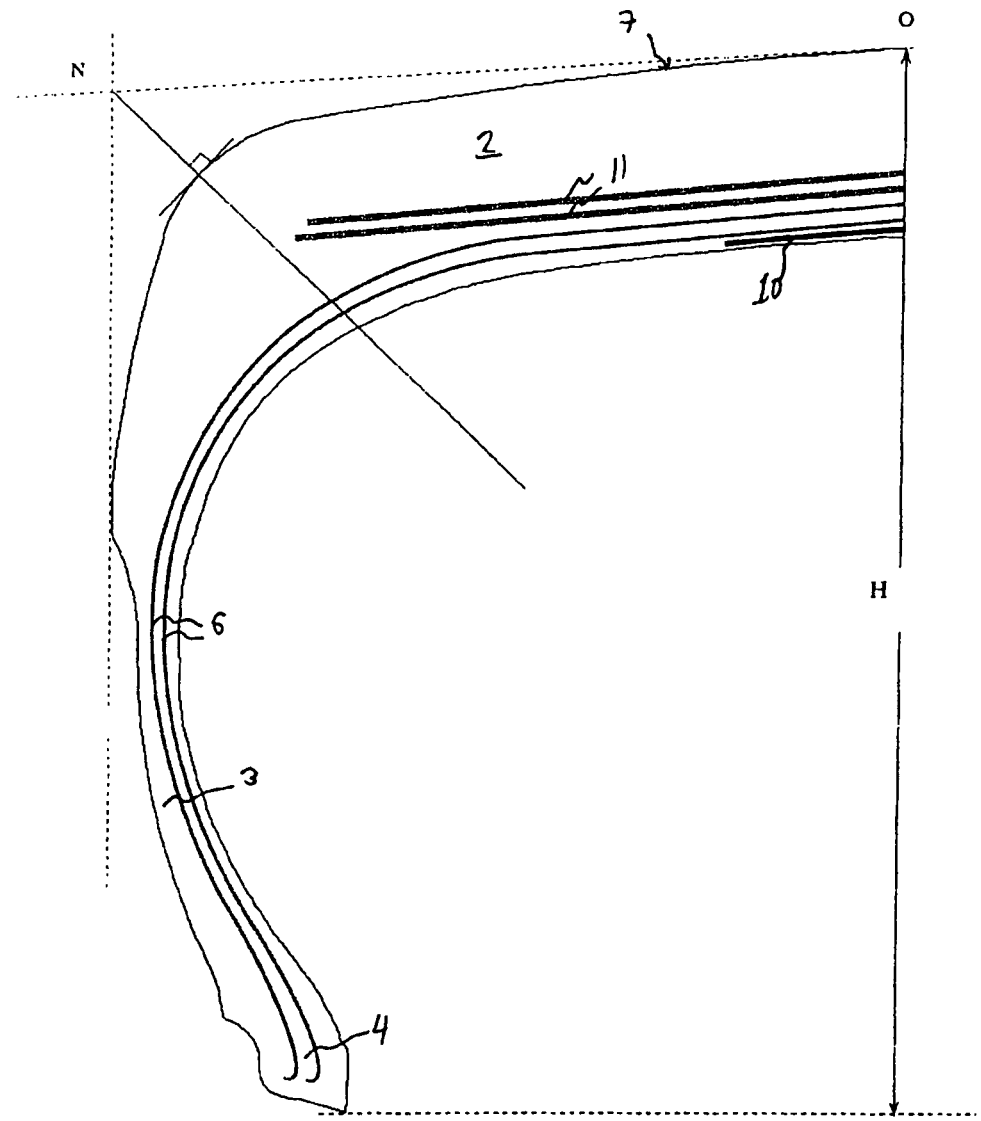
FIG. 7 depicts a section similar to that of FIG. 1a with another example of the positioning of a bielastic reinforcing element, this time in the crown region.

FIGS. 4, 5 and 6 show alternative forms with two reinforcing elements 10. In FIG. 4, the elements 10 are, on the one hand, on the inside of and, on the other hand, on the outside of the structures 6. In FIG. 5, one element is on the outside of and the other is between the two structures 6. In FIG. 6, one element is on the inside of and the other is between the two structures 6.

Although in these examples the elements are substantially aligned radially, other alternative forms which have not been shown provide configurations in which two or more elements 10 occupy different radial positions.

FIGS. 7 to 11 show alternative forms of embodiment in which elements 10 are provided in the crown region of the tire. Thus, in FIG. 7, the element 10 is positioned substantially axially centrally, on the inside of the reinforcing structures 6. In FIG. 8a, the element 10 is positioned substantially axially centrally on the outside of the reinforcing structures 6, between these and the crown reinforcing layers 11.

Figure 8A:
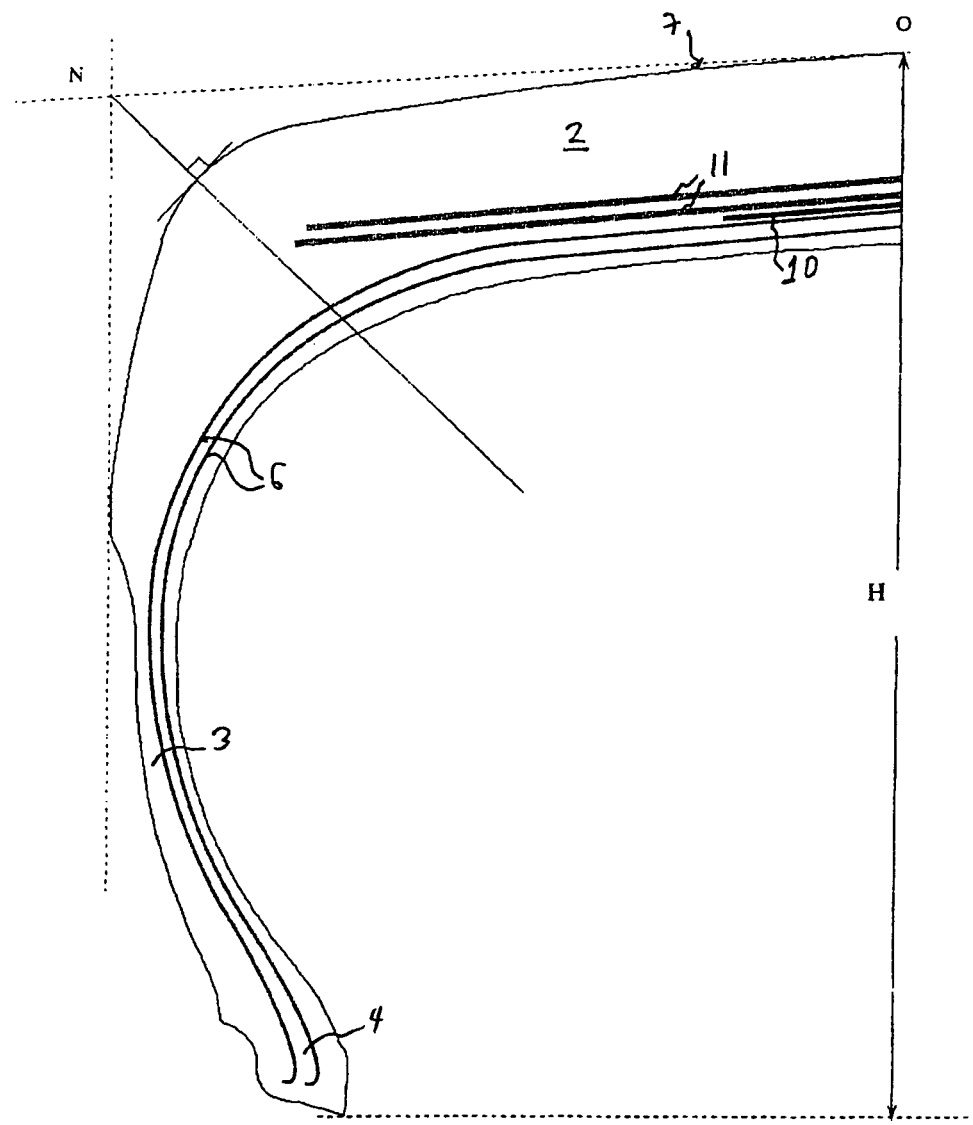
FIGS. 8a and 8b depict views similar to that of FIG. 1a, with yet more examples of positionings of a bielastic reinforcing element.
Figure 8B:
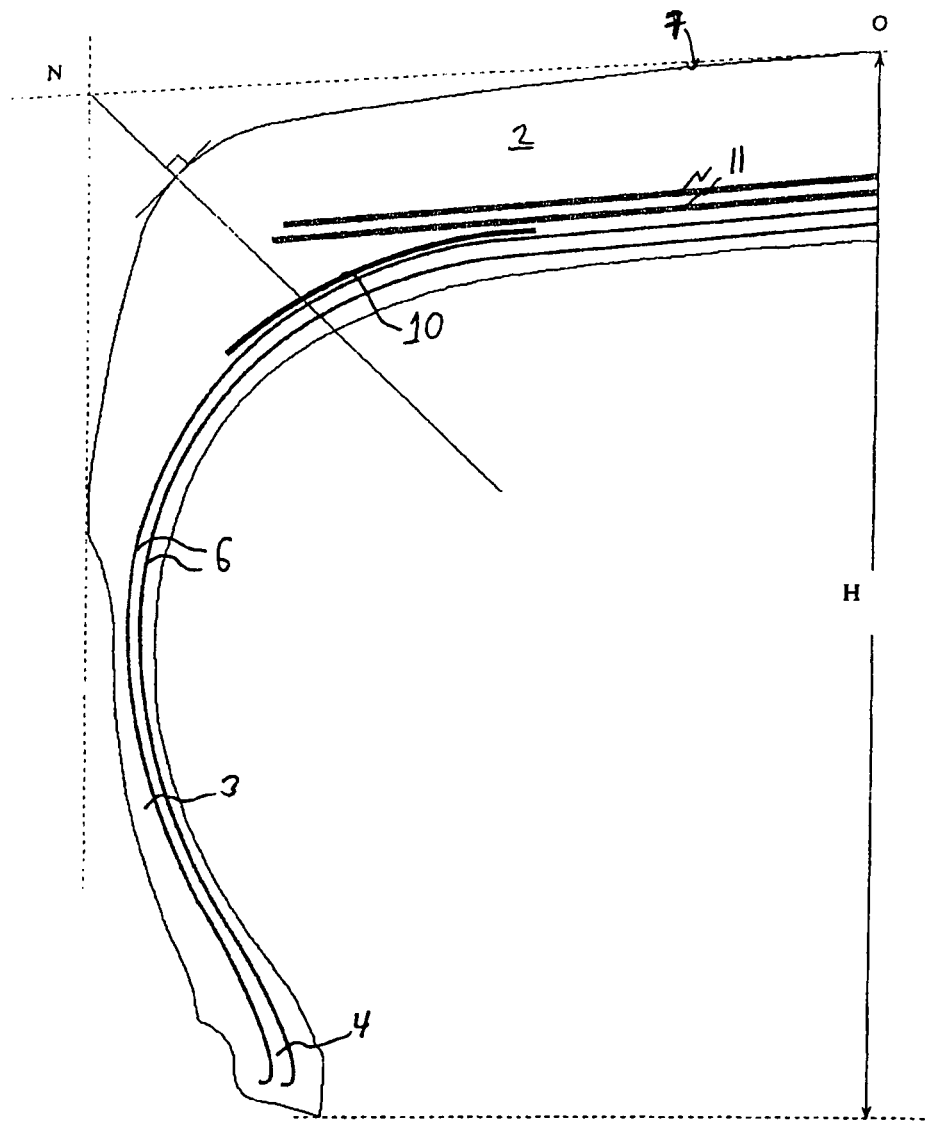

FIG. 8b shows an alternative form of embodiment in which the reinforcing element 10 occupies a position somewhere between the examples of FIGS. 1 to 7 and the examples of FIGS. 8a and 9 to 11. Thus, the element 10 lies where the shoulder meets the crown, on the outside of the reinforcing structures 6. On one side, the element 10 is extended radially inwards with respect to the straight line passing through the point N, and on the other side, it extends until it infiltrates between the crown reinforcements 11 and the reinforcing structures 6 in the portion where these meet.

Figure 9:
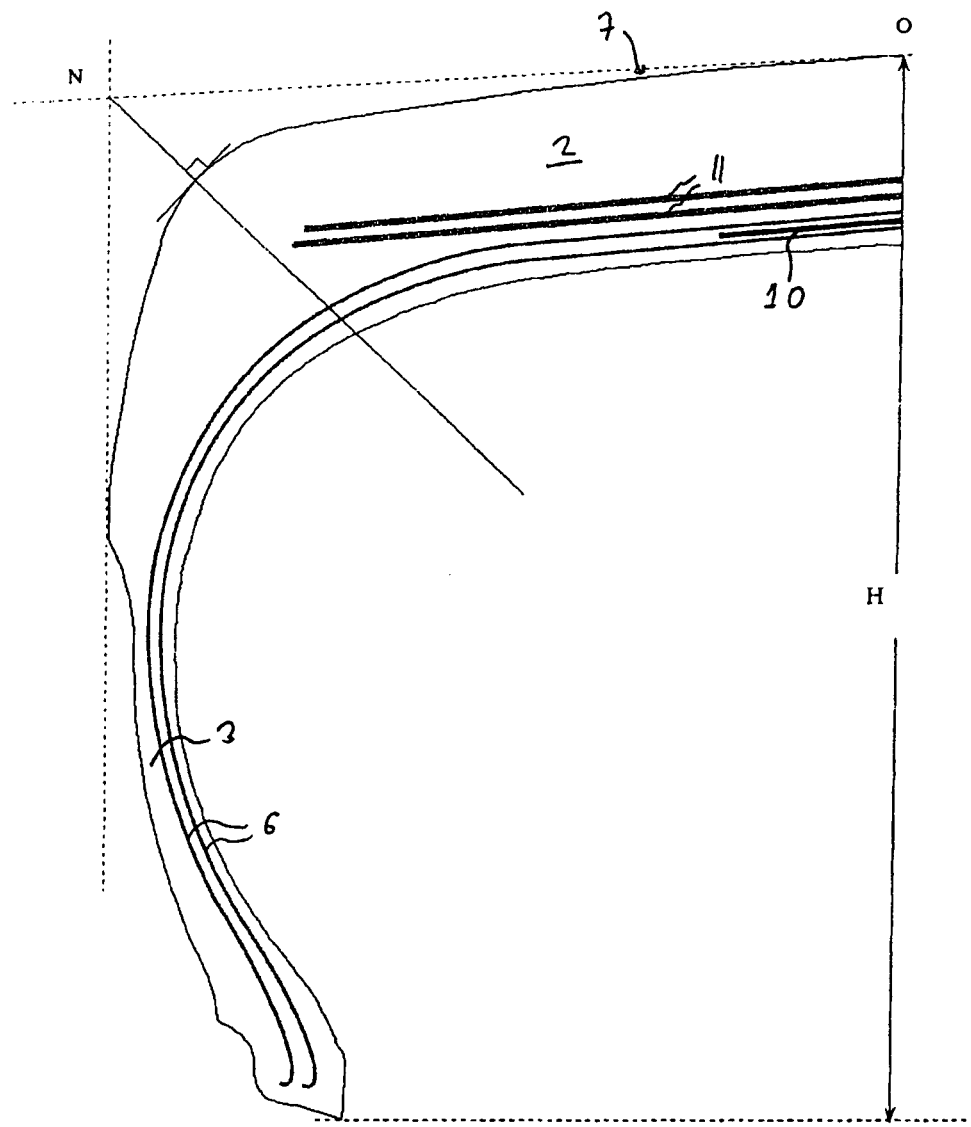
FIG. 9 depicts a view similar to that of FIG. 1a with yet another example of the positioning of a bielastic reinforcing element.

In FIG. 9, the element 10 is positioned substantially axially centrally, between the two reinforcing structures 6.

Figure 10:
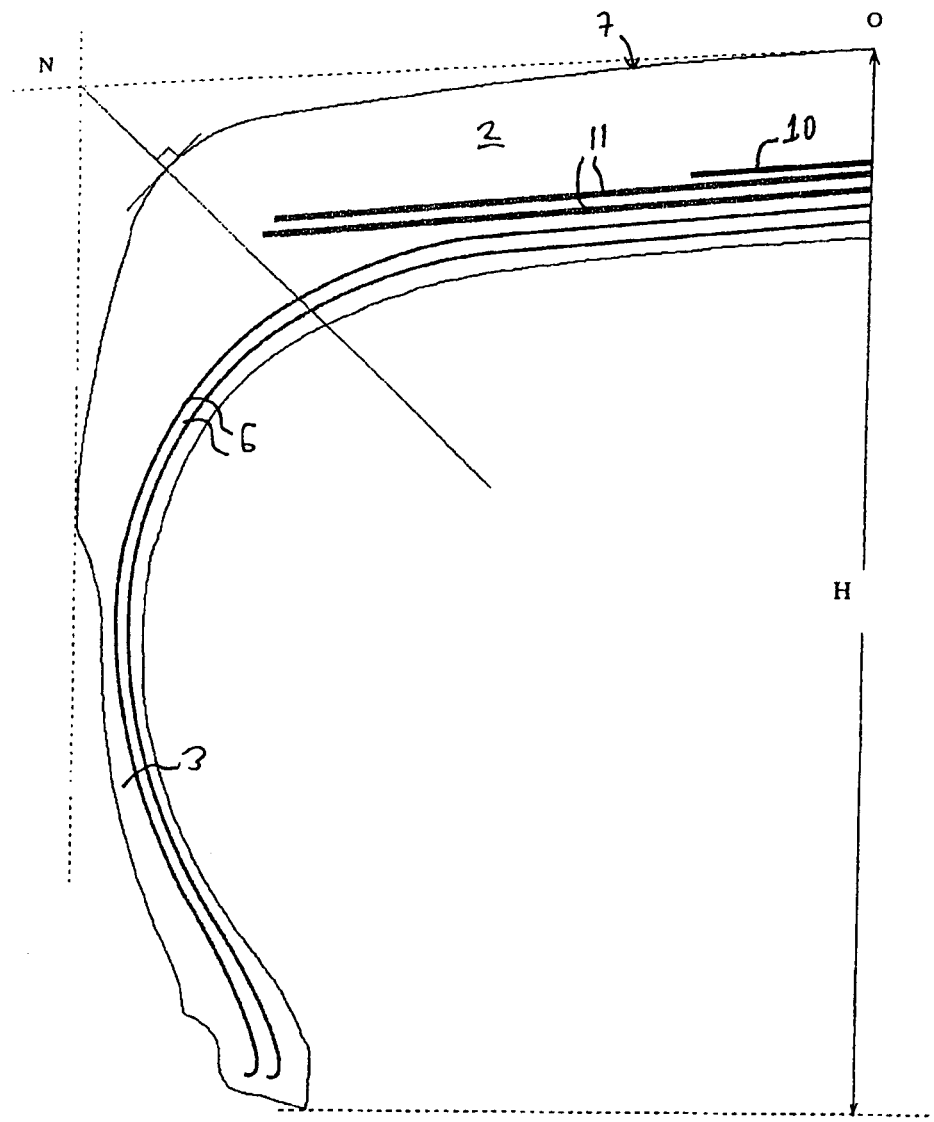
FIG. 10 depicts a view similar to that of FIG. 1a with yet another example of the positioning of a bielastic reinforcing element.
Figure 11:
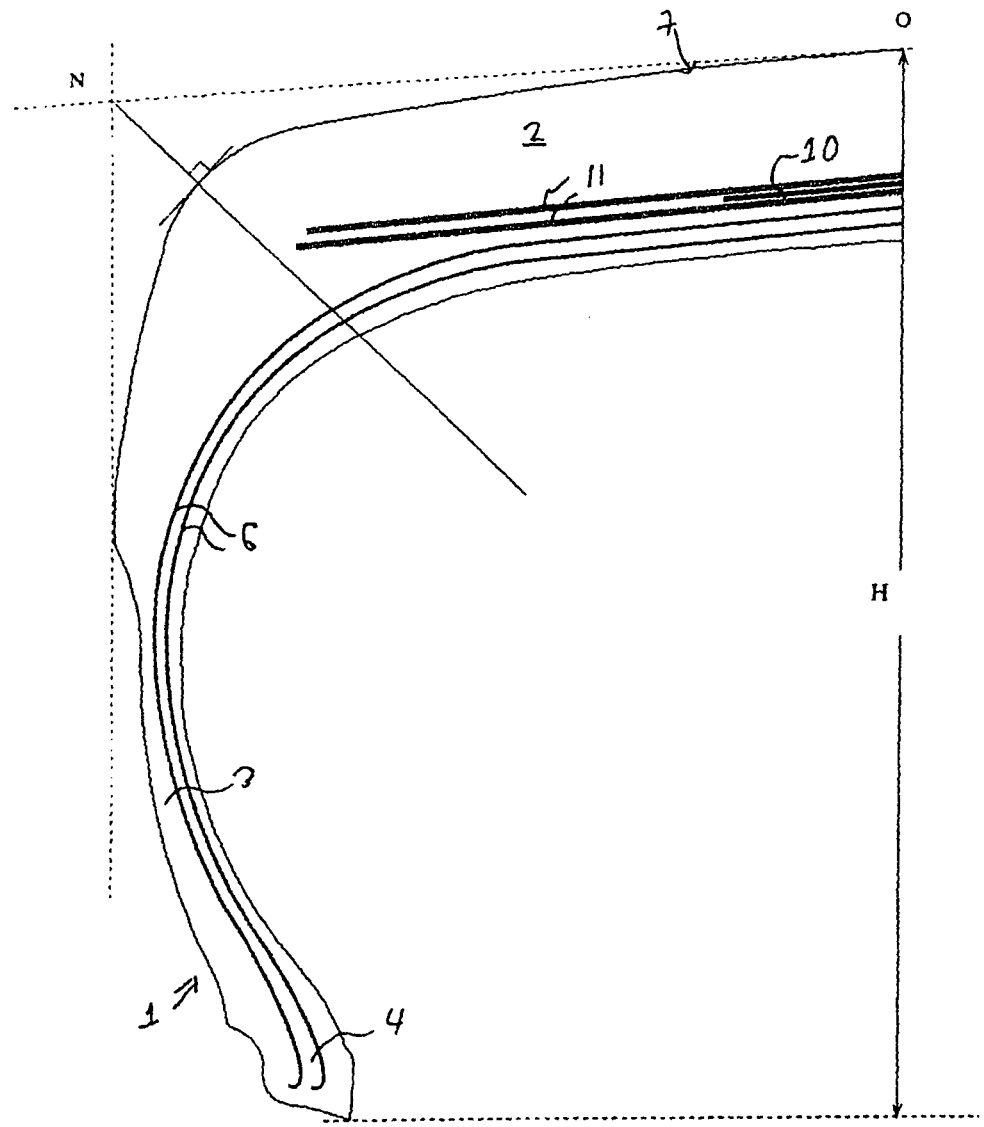
FIG. 11 depicts a view similar to that of FIG. 1a with a final example of the positioning of a bielastic reinforcing element.

In FIG. 10, the element 10 is positioned substantially axially centrally, on the outside of the crown reinforcements 11, and in FIG. 11, the element 10 is positioned substantially axially centrally, between the two crown reinforcements 11.

The invention claimed is:

1. A tire comprising:
   two beads, wherein the base of each bead is configured to be mounted on a rim seat,
   a sidewall extending each bead radially outwards,
   a tread meeting the sidewalls radially outwards of the beads,
   at least two reinforcing structures of the carcass type, comprising one inner carcass-type reinforcing structure and outer carcass-type reinforcing structure, wherein each of the said carcass-type reinforcing structures runs circumferentially and extends from the bead towards said sidewall, and is anchored on each side of the tire in the respective bead,
   at least one circumferential bielastic reinforcing element which is made of a bielastic knit fabric which is a loop mesh fabric comprising mesh-forming loops which are able to move relative to one another in a direction of knitting and in a direction perpendicular to the direction of knitting,
   wherein said at least one bielastic reinforcing element is adjacent to, and radially inward of, at least one of the carcass-type reinforcing structures, is positioned in such a way as to run substantially parallel to this carcass-type reinforcing structure, and is entirely positioned in that portion of the sidewall that lies radially outside of a position corresponding to H/2, where H is the height of the radially outermost point of the tread above a line connecting the radially innermost points of the beads.

2. The tire according to claim 1, further comprising at least one crown reinforcing structure, each crown reinforcing structure comprising a series of crown reinforcing threads each of which is positioned in such a way as to extend transversely.

3. The tire according to claim 1, wherein the said bielastic reinforcing element is, for the most part, positioned in the crown region of the tire.

4. The tire according to claim 1, wherein the said bielastic reinforcing element has a minimum length corresponding to 1/10 of the arc L, the arc L substantially corresponding to the path of the carcass-type reinforcing structures between the position corresponding to H/2 and a straight line passing through an end point N of the shoulder and perpendicular to the point of intersection with the outer portion of the shoulder, the end point N of the shoulder being defined, in the shoulder region of the tire, by the orthogonal projection onto the exterior surface of the tire of the intersection between, on the one hand, the tangents to the surfaces of an axially outside end of the tread and, on the other hand, the radially outside end of a sidewall.

5. The tire according to claim 1, wherein the bielastic knit fabric has at least one of the following properties:
an elastic elongation of at least 8%,
a mesh size smaller than or equal to 150 meshes per decimeter.

6. The tire according to claim 5, wherein the mesh size is small than or equal to 200 meshes per decimeter.

7. The tire according to claim 5, wherein the bielastic knit fabric has the following properties:
an elastic elongation of at least 8%,
a mesh size smaller than or equal to 150 meshes per decimeter.

8. The tire according to claim 7, wherein the mesh size is small than or equal to 200 meshes per decimeter.

9. The tire according to claim 1, wherein the said bielastic knit fabric comprises at least one material selected from the group consisting of polyamides, polyesters, rayon, cotton, wool, aramide, silk and linen.

10. The tire according to claim 1, wherein the bielastic knit fabric contains elastic threads selected from the group consisting of polyurethane, latex, or natural or synthetic rubber.

11. The tire according to claim 1, wherein the bielastic knit fabric has a thickness ranging between 0.2 mm and 2 mm.

12. The tire according to claim 11, wherein the bielastic knit fabric has a thickness ranging between 0.4 mm and 1.2 mm.

13. The tire according to claim 1, wherein the bielastic knit fabric has a basis weight of between 70 and 700 g/m$^2$.

14. The tire according to claim 13, wherein the bielastic knit fabric has a basis weight ranging between 140 and 410 g/m$^2$.

15. The tire according to claim 1, wherein the bielastic knit fabric is made of at least one polymer chosen from thermosetting polymers and thermoplastic polymers.

* * * * *